Patented July 30, 1935

2,009,440

UNITED STATES PATENT OFFICE 2,009,440

RETARDING STALING OF BREAD

Albert K. Epstein and Benjamin R. Harris, Chicago, Ill.

No Drawing. Application December 4, 1933,
Serial No. 700,828

19 Claims. (Cl. 99—10)

Our invention relates to retarding staling of bread.

The principal object of our invention is the provision of means for retarding the staling of bread.

Another object is to maintain the so-called fresh condition of bread for a longer period of time than has been possible heretofore.

Another object is the provision of substances which, when added to a bread dough, will retard staling of the final baked loaf.

We have discovered that if arabinose, either in a substantially pure form or mixed with other ingredients, as will be explained hereinafter, is mixed with the bread dough, the resulting baked loaf will resist staling and be maintained in a fresh condition for a longer period of time than bread baked without the addition of arabinose. In other words, when this substance is added in proper quantities to a dough batch composed of flour, yeast, sugar, salt, water, and other materials used in bread, the dough prepared in the usual manner, formed into loaves, and the loaves baked, the baked loaf will remain fresh longer than a baked loaf not containing arabinose.

We are aware that the staleness of bread is not due primarily to the loss of moisture, in view of the fact that if so-called stale bread is heated, it will acquire the usual characteristics of freshness such as tenderness. The substance which we add to the bread has no moisture retaining qualities, but must function in some manner in connection with the other ingredients to retard so-called staleness. Although theories can be advanced, we wish it understood that the invention is not limited to any particular theory.

We shall first consider the invention from the standpoint of the direct addition of arabinose. We have found that if this material is added in proportions from about .5% to 1% on the basis of the flour used, the final baked loaf will remain fresh for a period ranging from twenty-four to forty-eight hours longer than the ordinary baked load. Larger quantities of the arabinose can, of course, be used, or even smaller quantities in some cases. In preparing the dough batch, the arabinose may be added and mixed with the flour, sugar, water, yeast, or, in fact, any of the ingredients, whether ordinary or accessory ingredients, employed in the baking formula. The dough is leavened in the usual manner and baked according to custom.

In order to make the product convenient for sale to and use by the baker so that the arabinose will be properly and uniformly distributed throughout the entire dough batch, we may admix with the arabinose a definite amount of a dilutent, preferably materials usually used in bread. Convenient materials which can be admixed with the arabinose are the so-called "bread accessories". This class of materials usually includes farinaceous materials such as flour, starch, dextrins, partially dextrinized starch, processed corn flour, sugars such as cane sugar, malt sugar and corn sugar, yeast foods of a mineral nature such as innocuous calcium salts, calcium sulphate, calcium phosphate, innocuous ammonium salts, carbamid, and vegetable substances containing enzymes such as soy-bean flour, oxidizing agents such as potassium bromate, potassium chlorate, sodium bromate, sodium chlorate, iodates, and other accessories used in the dough batch. It will be noted that among the list of accessories given above are certain materials which are sometimes used in themselves as dilutents as, for example, in commercial "yeast foods".

A suitable and convenient mixture is 50 pounds of arabinose to 50 pounds of the dilutent. When 1% to 2% of this mixture is added to the dough batch on the basis of the flour, the proportion of arabinose will obviously be within the preferred range set out in a previous paragraph. The material so added should, of course, be thoroughly mixed with the dough batch.

The arabinose may also be dispensed commercially in a liquid or some liquid preparation, as, for example, admixed with corn syrup, malt extract, and other ingredients which are usually used in the manufacture of yeast leavened bread. We have found that any form of bread fermentation may be used; that is to say, either the straight dough process or the sponge process may be employed, and, in either case, the arabinose should be mixed with the dough so as to become thoroughly and uniformly incorporated in the batch.

In addition to the arabinose in substantially pure form we may employ other materials which either contain arabinose or may be treated to cause a reaction in a constituent thereof to produce arabinose. For convenience, this phase of the invention will be described in connection with the use of gum arabic as a source of arabinose. In a prior filed co-pending application, we describe the use of gum arabic as an aid in retarding staleness of yeast leavened bread. In this application, the function of the gum arabic was due primarily to its water absorption capacity and to its colloidal and jelling properties, which, in connection with the other ingredients of the bread dough, affected the colloidal conditions of the starch protein complexes. We have discovered that if we take gum arabic and hydrolyze it with an acid so as to destroy completely its jelling and colloidal properties, as well as its water absorption capacity, we obtain a product which, when added to a yeast leavened dough batch, will result in retardation of staling when the dough is baked into bread. We conceive this result to be due to the formation of arabinose. We have also found that we can obtain similar results when we hydrolyze other gums such as gum tragacanth, various gum acacias, pectins from various sources and cherry gums, with acids. As an example of this latter phase of the invention, a solution containing about 30% of gum arabic is heated to boiling with 2% of sulphuric acid on the basis of the water, and the entire solution boiled for about ten minutes. The product is then cooled, neutralized with lime to form calcium sulphate, and then part of the water driven off if it is desired to produce a heavy syrup. Gum acacia may also be hydrolyzed by heating a 25 or 30% solution of the gum in water with hydrochloric acid for about an hour or longer. The solution is then neutralized with sodium carbonate to form sodium chloride. The hydrolysate may be used in the liquid condition, or it may be further evaporated to a syrupy consistency and used in this manner in connection with bread making.

If desired, the hydrolysates obtained above may be further purified by adding to the hydrolysate after neutralization 90% alcohol until no more precipitation takes place. The clear liquid is then separated, the alcohol distilled off, and the remainder evaporated to a syrup. This syrup will contain the active constituents which, when added to the dough batch, will retard staling of the baked loaf formed therefrom. The amount of the hydrolysate added to the dough batch may, of course, vary. A satisfactory amount is about 1% to 2%, based on the weight of the original gum and the flour.

Among the gums which we have found will, when hydrolyzed with acid, yield products which will retard the staling of bread, are the class of gums known as acacia gums, derived from the acacia species of plants. An important member of this group is gum arabic which comes from Acacia Senegal; gum tragacanth, India gum, and cherry wood gum also produce hydrolysates suitable for our purpose. The hydrolysates of agar agar may also be used, but a larger proportion is required than, for example, of gum arabic to produce equivalent results.

The examples given are illustrative of the treatment and manner of use of all of these gums. In other words, we can use the hydrolysates in their aqueous solutions, neutralized to form calcium sulphate, or where hydrochloric acid is used, preferably neutralized to produce sodium chloride. The hydrolysates may also be used in the form of a syrup in combination with other substances such as malt extract or corn syrup.

It will be noted that sodium chloride is an ordinary constituent of bread, while calcium sulphate may also be a constituent of bread, coming under the classification of accessory materials described hereinabove. The hydrolysates of all of these gums contain a proportion of arabinose. The hydrolysates, however, appear to have an effect not entirely due to the proportion of arabinose present. We, therefore, do not limit ourselves to the use of these gum hydrolysates merely for their arabinose content, as other constituents present apparently exert an influence.

Those skilled in the art will understand that certain care must be taken in preparing the hydrolysates referred to hereinabove. The hydrolysis must be carried out in such a way as to avoid the formation of objectionable by-products such as furfural, which are apt to form when higher temperatures and/or higher concentrations of acids are used. As in all cases involving chemical treatment, something must be left to the skill of the operator. The appended claims define the scope of our invention.

What we claim as new and desire to protect by Letters Patent of the United States is:

1. As a new article of manufacture, a baked bread loaf containing a relatively small proportion of arabinose.

2. As a new article of manufacture, a baked bread loaf containing a relatively small proportion of arabinose containing hydrolysate of a gum.

3. As a new article of manufacture, a baked bread loaf containing a relatively small proportion of a hydrolysate of a gum of a class consisting of gum arabic, gum tragacanth, agar agar, gum acacia, pectin, and cherry gum, said hydrolysate containing arabinose.

4. A dough batch including flour, aqueous material, yeast as a leavening agent, and a relatively small amount of arabinose.

5. A dough batch including flour, aqueous material, yeast as a leavening agent, and a relatively small amount of a gum hydrolysate containing arabinose.

6. A dough batch including flour, aqueous material, yeast as a leavening agent, and a relatively small amount of a hydrolysate of a gum of a class consisting of gum arabic, gum tragacanth, agar agar, gum acacia, pectin, and cherry gum, said hydrolysate containing arabinose.

7. A dough batch including flour, aqueous material, yeast as a leavening agent, and a relatively small amount of an acid hydrolysate of gum acacia neutralized with an alkali, said hydrolysate containing arabinose.

8. A dough batch including flour, aqueous material, yeast as a leavening agent, and a relatively small amount of a hydrochloric acid hydrolysate of gum acacia neutralized with sodium carbonate, said hydrolysate containing arabinose.

9. A dough batch including flour, aqueous material, yeast as a leavening agent, and a relatively small amount of a sulfuric acid hydrolysate of gum acacia neutralized with lime, said hydrolysate containing arabinose.

10. A process for retarding the staling of yeast leavened bread comprising adding to a dough batch containing flour, aqueous material and yeast as a leavening agent, a relatively small amount of arabinose, forming the dough into loaves, and baking the loaves.

11. A process for retarding the staling of yeast leavened bread which comprises hydrolyzing a vegetable gum of a class consisting of acacia gums, cherry wood gum, gum tragacanth, agar agar and pectin, to produce arabinose, neutralizing the hydrolysate with an alkali, and adding the hydrolysate to a dough batch including flour, aqueous material, and yeast as a leavening agent.

12. A process for retarding the staling of yeast leavened bread which comprises hydrolyzing a vegetable gum of a class consisting of acacia gums, cherry wood gum, gum tragacanth, agar agar and pectin, to produce arabinose, neutralizing the hydrolysate with lime, and adding the hydrolysate to a dough batch including flour, aqueous material, and yeast as a leavening agent.

13. The process for retarding the staling of yeast leavened bread which comprises hydrolyzing gum acacia with an acid to produce arabinose, neutralizing the resulting hydrolysate with an alkali, and adding the neutralized hydrolysate to a dough batch including flour, aqueous material and yeast as a leavening agent.

14. The process for retarding the staling of yeast leavened bread which comprises hydrolyzing gum acacia with hydrochloric acid to produce arabinose, neutralizing the resulting hydrolysate with an alkali, and adding the neutralized hydrolysate to a dough batch including flour, aqueous material and yeast as a leavening agent.

15. The process for retarding the staling of yeast leavened bread which comprises hydrolyzing gum acacia with hydrochloric acid to produce arabinose, neutralizing the resulting hydrolysate with sodium carbonate, and adding the neutralized hydrolysate to a dough batch including flour, aqueous material and yeast as a leavening agent.

16. The process for retarding the staling of yeast leavened bread which comprises hydrolyzing gum acacia with sulphuric acid to produce arabinose, neutralizing the resulting hydrolysate with lime, and adding the neutralized hydrolysate to a dough batch including flour, aqueous material and yeast as a leavening agent.

17. The process for retarding the staling of yeast leavened bread which comprises hydrolyzing a vegetable gum of a class consisting of acacia gums, cherry wood gum, gum tragacanth, agar agar and pectin, to produce arabinose, neutralizing the hydrolysate with an alkali, evaporating the neutralized hydrolysate to form a syrup, and adding the syrup to a dough batch including flour, aqueous material, and yeast as a leavening agent.

18. A composition of matter adapted for retarding the staling of yeast leavened bread comprising a fermentable sugar syrup of a class consisting of cane sugar syrup, dextrose syrup, corn syrup, and malt extract in combination with an arabinose containing hydrolysate of a vegetable gum.

19. A composition of matter adapted for use in yeast leavened bread comprising an intimate mixture of arabinose and a bread accessory material.

ALBERT K. EPSTEIN.
BENJAMIN R. HARRIS.